Figure 1:
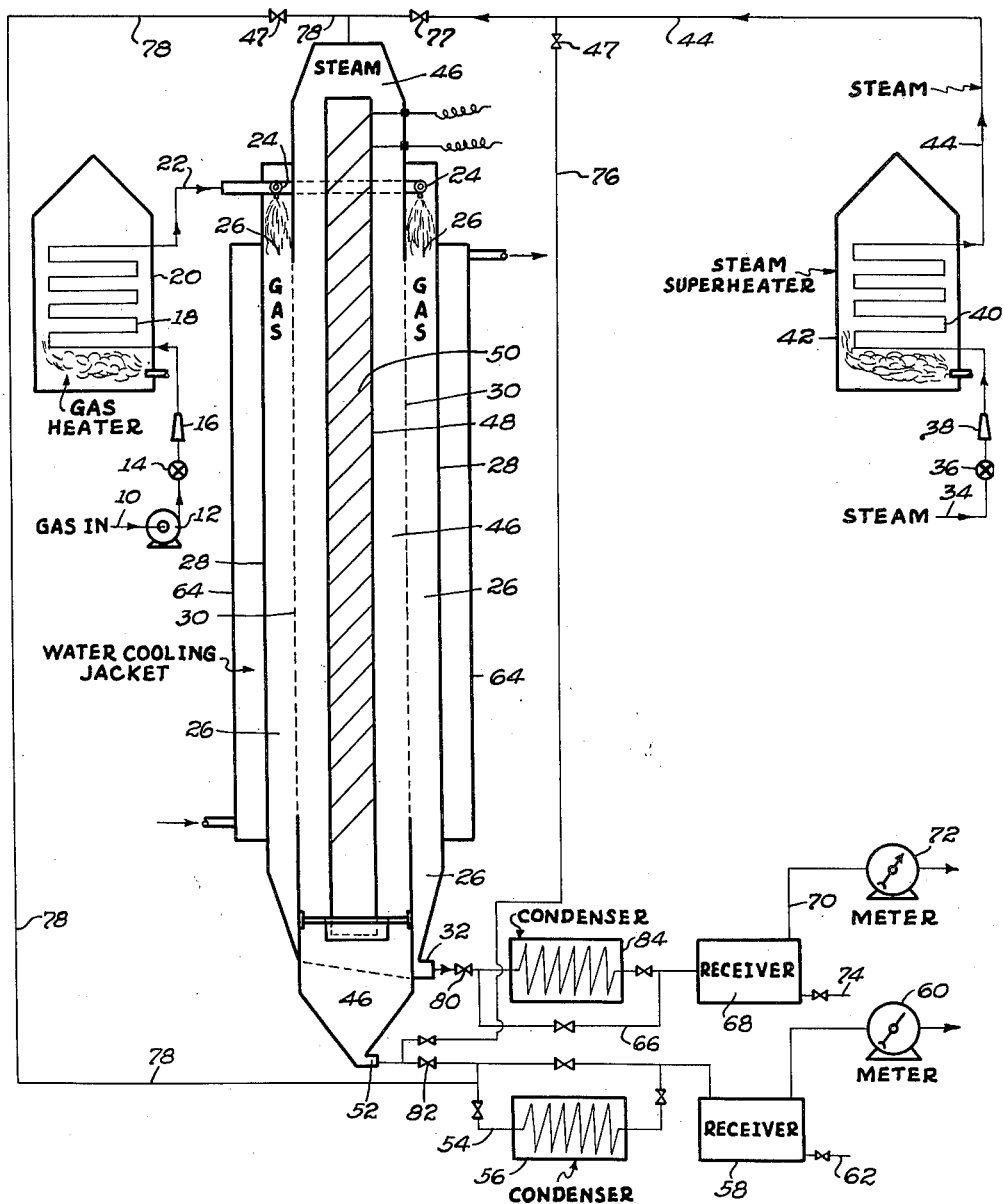

March 18, 1952  F. A. SCHWERTZ  2,589,297
PROCESS OF SEPARATING GASES BY DIFFUSION
Filed Feb. 27, 1947  2 SHEETS—SHEET 1

Inventor
FREDERICK A. SCHWERTZ
By Edmund G. Borden
his Attorney

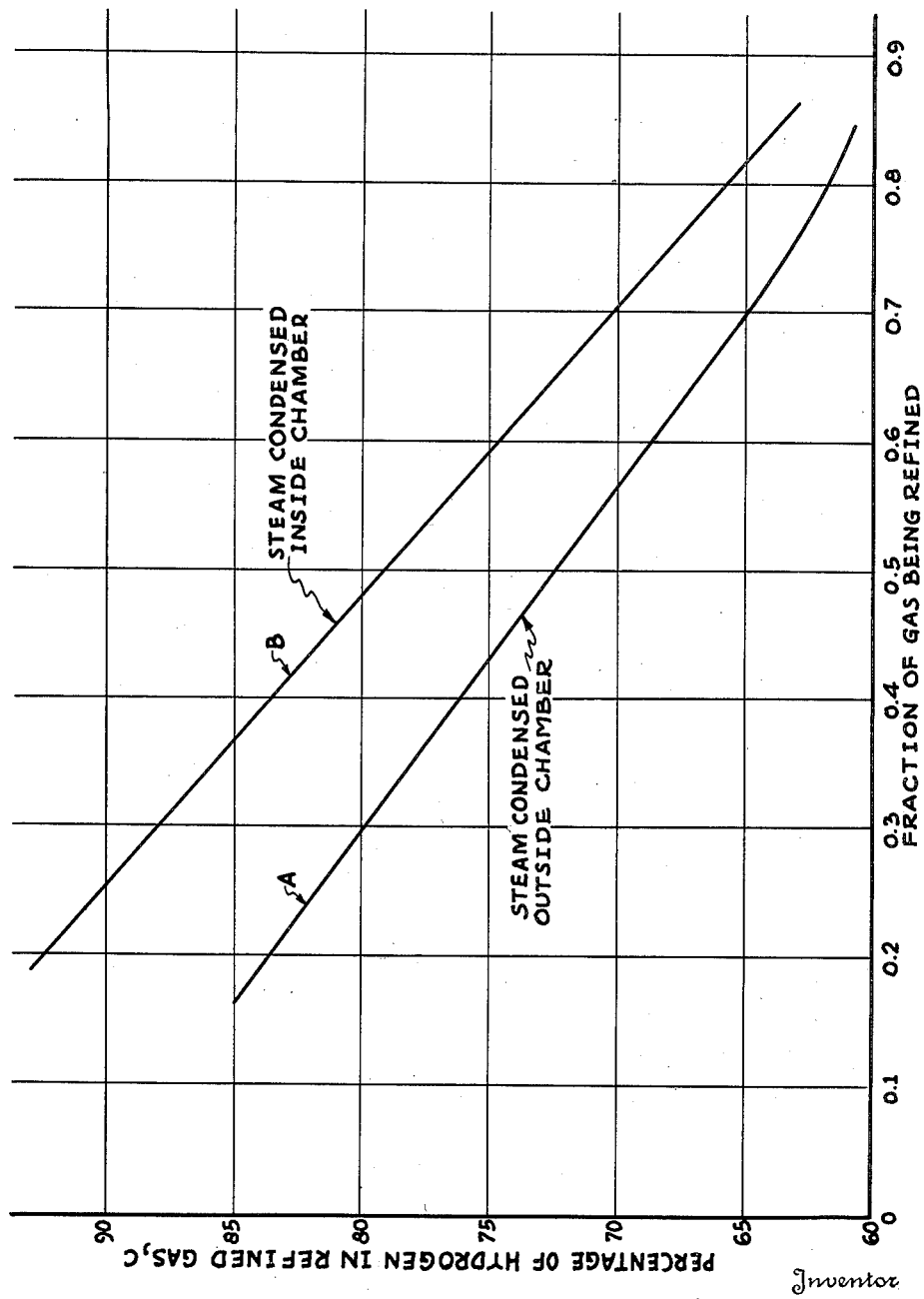

Patented Mar. 18, 1952

2,589,297

UNITED STATES PATENT OFFICE 2,589,297

PROCESS OF SEPARATING GASES BY DIFFUSION

Frederick Anton Schwertz, Pittsburgh, Pa., assignor to Koppers Company, Inc., Pittsburgh, Pa., a corporation of Delaware Application February 27, 1947, Serial No. 731,265

12 Claims. (Cl. 183—115)

This invention relates to diffusion. More particularly the invention relates to the separation of a constituent from gas with the aid of a condensible sweep medium wherein the sweep medium is condensed within the diffusion zone as it diffuses through a porous boundary.

In the separation of a constituent of gas by diffusion it is customary to pass the gas along one side of a porous boundary or diaphragm, and a sweep medium along the opposite side of the boundary. The constituent being separated from the gas passes through the boundary and the sweep medium acts to sweep the constituent away from the boundary. The rate of diffusion of the gas constituent in one direction and of the sweeping medium in the other is inversely proportional to the square of the sum of the molecular diameter of the constituent and of the molecular diameter of the molecules composing the sweep medium. The rate of diffusion is also proportional to the square root of the sum of the reciprocal mass of the constituent and of the reciprocal mass of the molecules composing the sweeping medium. The total amount of gas transferred through the porous boundary depends, in addition, on the controllable pressure difference across the boundary. In other words, superimposed on the diffusive transfer of gas there is a transfer of gas across the boundary because of pressure differences on opposite sides of the boundary.

Some industrial manufactured gases, such as coke oven gas, refinery still gas, and oil cracking still gas, contain high percentages of hydrogen (from 50 to 80%). It is very advantageous, therefore, to refine these gases to obtain hydrogen or to separate hydrogen from other constituents in the gas.

The hydrogen in a gas diffuses through the boundary much faster than other constituents because the diameter and mass of the molecules are much smaller for hydrogen than for other constituents usually found in the gas. Therefore when the hydrogen content of a sweep medium has been built up by diffusion to a definite amount the hydrogen in the sweep medium tends to move back through the boundary into the gas being refined, if the boundary is sufficiently long to permit this. Therefore, the velocity of the gas and the length of the boundary tend to limit the efficiency of diffusion and the capacity of the apparatus for effecting the diffusion separation.

I have discovered that if a condensible vapor, such as steam, is used as the sweep gas, and if the steam which diffuses through the boundary into the gas being refined is condensed in the diffusion zone, that a substantially greater percentage of a light constituent, such as hydrogen may be separated by diffusion from the gas than if the steam is not condensed in the diffusion zone.

The primary object of the present invention is to provide a method of separating a constituent from gas by diffusion in which diffusion vapors of sweep gas are condensed from the fuel gas within the diffusion zone.

Another object of the invention is to provide a method of diffusion separation of gases by which a non-condensing condition is maintained on the sweep medium side of a boundary and a condensing condition is maintained on the gas side of the boundary.

A further object of the invention is to provide a method of efficiently separating hydrogen from a manufactured gas containing a substantial percentage of hydrogen when using a minimum amount of steam as a sweep medium.

With these and other objects in view, the invention consists in the method of separating a constituent of gas by diffusion when a sweep vapor is condensed in the diffusion zone.

The various features of the invention are illustrated in the accompanying drawing in which, Figure 1, is a diagrammatic flow sheet of an apparatus in which the preferred method of diffusion may be carried out; and Figure 2 shows curves illustrating the hydrogen composition of various fractions of gas which are separated by diffusion from a coke oven gas, one curve giving the compositions of the gas separated by diffusion by the method of the present invention, and another comparative curve showing the hydrogen composition of the fractions of gases separated by diffusion in which no condensation of sweep steam is effected in the diffusion zone.

To carry out the method of the present invention in the apparatus illustrated in Figure 1, gas to be refined is introduced through a line 10 into a blower 12 and forced through a flow regulator 14 and a meter 16 to a heating coil 18 mounted in a heater 20. The heated gas flows from the heater through a line 22 into a distributor 24 mounted in the top of a gas chamber 26 of a diffusion apparatus. The chamber 26 is an annular chamber which is positioned between a cylinder 28 and a cylindrical porous diffusion diaphragm 30. The gas flows downwardly through the chamber 26 along the face of the diaphragm 30 and that gas which does not pass through the diaphragm flows out of the bottom of the chamber 26 through an outlet 32.

The sweep medium preferably used in the diffusion apparatus consists of steam which is introduced through a line 34 and flows through a flow regulator 36 and a meter 38. The measured steam then flows through a coil 40 mounted in a heater 42 for the purpose of superheating the steam to a sufficiently high temperature to keep the diffusion apparatus at a temperature within the steam zone sufficiently high to prevent the condensation of steam within the diffusion zone of the apparatus. The steam flows from the superheater through a line 44 into the top of the steam chamber 46 of the diffusion apparatus, a valve 47 being closed. The chamber 46 is an annular chamber located between the diaphragm 30 and a central core 48 mounted in the central portion of the steam chamber. The steam flows downwardly through chamber 46 in a concurrent direction with the flow of gas but upon the opposite side of the boundary 30 from the gas. As the steam and gas thus flow in a continuous stream along the face of the boundary 30 there is a diffusion of the constituents of the gas and the steam through the boundary. Since the rate of diffusion is dependent upon the masses and molecular diameters of the constituents of the two gas streams, it will be apparent that the constituent which has the smaller diameter and the smaller mass will flow at a higher rate than the gas constituents which have a large molecular diameter and mass.

The temperature condition within the sweep steam chamber 46 is controlled to prevent condensation of the steam within the diffusion zone, by the amount of superheat put into the steam in the heater 42. Furthermore, an electrical heating coil 50 may be mounted upon the core 48 to maintain the desired temperature within the diffusion zone. The heating coil 50 may be used alone for controlling the temperature in the diffusion zone, or the temperature of the steam passing through the heater may be used entirely for controlling the temperature in the heating zone. Further, both the heating coil 50 and the superheater 42 may be used for controlling the temperature.

All of the steam, together with any gas which diffuses through the boundary 30 that reaches the bottom of the diaphragm 30, flows out of the bottom of the chamber 46 through an outlet 52. The mixture of steam and gas flows from the outlet 52 through a line 54 into a condenser 56 where the steam is condensed and the mixture of condensed steam and gas then flows into a receiver 58. The gas flows out of the receiver 58 through a meter 60 where its volume may be measured. The condensed steam is removed from the receiver 58 through an outlet 62 at the bottom of the receiver.

The gas flowing down through the chamber 26 is cooled by heat interchange with a cooling liquid (water) which is circulated through a water jacket formed by the shell 64 that surrounds the cylinder wall 28. The temperature and volume of water passed through the jacket is such as to condense all or part of the steam which diffuses through the boundary 30 and this condensed steam with the gas flows to the bottom of the chamber 26 and through the outlet 32. The gas and steam then flow through a line 66 into a receiver 68 where the gas is separated from the water. The gas may leave the top of the receiver 68 through a line 70 and pass through a meter 72 to be measured. The condensed steam or water is withdrawn from the bottom of the receiver 68 through a line 74.

The circulation of gas being refined and steam as described above is the preferred method of refining gas, but it has been found that the stream of steam and coke over gas may be circulated in countercurrent streams at opposite sides of the boundary to carry out an effective diffusion. To carry out the countercurrent circulation the superheated steam from the line 44 is passed through a line 76, the valve 77 being closed, to introduce the steam through the opening 52 at the bottom of the chamber 46. This steam then flows upwardly through the chamber 46, leaving the top of the steam chamber through a line 78 which conducts the mixture of steam and gas to the line 54, the valve 47 being open. This mixture may then pass through the condenser 56, receiver 58, and meter 60. For the countercurrent flow the feed gas passes through the gas chamber 26 in the same manner and with the same connections as described above.

The process outlined above is particularly adapted for the refining of manufactured industrial gases such as coke oven gas, that normally contains 57% hydrogen, as well as various gases that are formed in an oil refinery in the distillation and cracking of oil. These oil refinery gases may vary from 50% to 80% in hydrogen. In some cases it is important with refinery gases to remove the hydrogen from the hydrocarbon constituents in the gas and the apparatus illustrated above is well adapted for this purpose. For coke oven gases and other refinery gases it is often desirable to obtain a substantially pure hydrogen therefrom by the present process. Steam is a very desirable sweep gas for refining high hydrogen gases because this vapor may be handled at moderate temperatures and may be ordinarily separated from the gaseous constituents by mere condensing operation. It is apparent, however, that the sweep gas vapor which may be used may be any vapor which does not react with, or in the liquid state is not a solvent for the gas constituent being separated, and which is readily condensible to separate the vapor from the gas being separated.

Referring to the curves of Figure 2, the curve A is a curve plotted from the data shown in Tables 1 and 3 below. The curve B is plotted from data in Tables 2 and 4. The data contained in Tables 3 and 4 relate to the same types of experiments as those represented by Tables 1 and 2, respectively. The data in Tables 3 and 4 were taken to repeat the runs of Tables 1 and 2 for the purpose of checking the data.

In the tables "Q" is the total amount of input gas flowing through the apparatus to be refined in litres per minute. "S" is the amount of steam flowing through the apparatus in grams per minute. "X" is the fraction of input gas passing through the boundary, and "C" is the hydrogen purity of the fractional part of the input gas passing through the boundary.

TABLE 1

| Run No. | Q | S | X | C |
|---|---|---|---|---|
| 1 | 4.90 | 15.5 | .158 | .855 |
| 2 | 5.01 | 15.7 | .293 | .796 |
| 3 | 4.99 | 15.8 | .538 | .716 |
| 4 | 4.79 | 15.7 | .713 | .644 |
| 5 | 4.82 | 15.6 | .955 | .582 |
| 6 | 4.85 | 15.6 | .854 | .606 |

TABLE 2

|  |  |  |  |  |
|---|---|---|---|---|
| 7 | 4.86 | 16.01 | .203 | .916 |
| 8 | 4.90 | 16.10 | .347 | .868 |
| 9 | 4.94 | 16.15 | .500 | .798 |
| 10 | 4.85 | 16.15 | .665 | .710 |
| 11 | 4.91 | 16.15 | .864 | .626 |

TABLE 3

|  |  |  |  |  |
|---|---|---|---|---|
| 12 | 4.86 | 15.7 | .204 | .835 |
| 13 | 4.95 | 16.0 | .353 | .779 |
| 14 | 5.00 | 15.6 | .436 | .749 |
| 15 | 4.99 | 15.5 | .493 | .731 |
| 16 | 4.99 | 15.3 | .659 | .670 |
| 17 | 4.95 | 15.4 | .845 | .621 |

TABLE 4

|  |  |  |  |  |
|---|---|---|---|---|
| 18 | 4.95 | 15.3 | .219 | .901 |
| 19 | 4.95 | 15.3 | .338 | .860 |
| 20 | 5.00 | 15.2 | .473 | .802 |
| 21 | 4.99 | 15.4 | .626 | .732 |
| 22 | 4.99 | 15.7 | .831 | .646 |

To obtain the data for these curves the volumes of steam and coke oven gas were closely regulated and measured by the flow regulators 36 and 14, respectively, and the meters 38 and 16, respectively. Furthermore, pressure control valves 80 at outlet 32, and 82 at outlet 52, may be regulated to control the pressure of the gas flowing through the chambers 46 and 26. By studying the flow through the meters 72 and 60 the amount of gas being separated by diffusion may be accurately controlled through the pressure control valves 80 and 82. On the plot of Figure 2 the ordinates are the percentages of hydrogen in the gas and the abscissi represent the fractional portions of the gas which has been separated by diffusion from the main gas sample. In obtaining curve B the method outlined above has been used wherein cooling water is used in the jacket 64 to condense steam that passes through the boundary 30. To obtain the data for curve A vapors of isoamyl alcohol were circulated through the jacket provided by the shell 64 to maintain a non-condensing temperature condition within the gas chamber 26 to hold the temperature sufficiently high so that no steam would condense in the diffusion zone. Therefore a mixture of steam and gas flows out of the bottom of the chamber 26. The steam present in the gas discharged through the outlet 32 from the chamber 26 is condensed by passing the gas through a condenser 84 in passing to the receiver 68.

From these curves it will be seen that from eight and a half to approximately three and one-half precent more hydrogen by volume may be separated from a gas being refined by diffusion when the sweep vapor is condensed in the diffusion zone.

When carrying out the present process it will be seen from the curves that a refined gas containing a comparatively high percentage of hydrogen may be obtained with a single pass through the diffusion apparatus if the flow is properly regulated. For economic reasons it is often desirable to increase the rate of flow of the gases on opposite sides of the boundary to obtain a refined gas of lower percentage of the desired constituent, such as hydrogen. This refined gas may in turn be recycled again through diffusion apparatus in order to increase the percentage of desired constituent in the refined gas. In practice it has been found that passage of coke oven gas and the refined hydrogen separated therefrom through diffusion apparatus three to four times, will give a gas of a hydrogen content of 95%, and from 90 to 92% of the available hydrogen may be separated from the coke oven gas.

The present process has particularly high diffusion separating efficiency in that the hydrogen may be separated from a coke oven gas, for example, with the minimum amount of steam and with a comparatively high capacity of the diffusion apparatus.

The preferred form of the invention having been thus described what is claimed as new is:

I claim:

1. A method of separating constituents of gas comprising: passing said gas along one side of a porous diffusion boundary in a diffusion zone, passing a condensible sweep vapor along the opposite side of the boundary, maintaining the constituents on the sweep vapor side of the boundary under conditions to prevent condensation thereof within the diffusion zone, maintaining temperature conditions in the diffusion zone to condense on the gas side only the sweep vapors which diffuse through the boundary to the gas side thereof, and separating condensible vapors from the gas streams leaving the diffusion zone.

2. The method defined in claim 1 in which the sweep vapor is steam.

3. The method defined in claim 1 in which the gas being treated is a manufactured gas containing at least 50% of hydrogen to separate hydrogen therefrom.

4. The method defined in claim 1 in which the gas being treated is of the group of industrial gases containing a substantial proportion of hydrogen consisting of coke oven gas, refinery still gas, and oil cracking still gas.

5. The method defined in claim 1 in which the gas being treated is a manufactured gas containing at least 50% hydrogen and the sweep vapor is steam.

6. The method defined in claim 1 in which the gas and vapor move in concurrent streams across the boundary.

7. The method defined in claim 1 in which the gas and sweep vapor move in countercurrent paths across the boundary.

8. A method of separating a constituent of a gas mixture comprising: continuously passing a gas mixture stream through a diffusion zone along one side of a porous diffusion boundary, continuously passing steam along the opposite side of the boundary, maintaining a temperature on the steam side of the boundary in the diffusion zone sufficiently high to prevent condensation of gas or vapor therein, cooling the gas and steam on the gas side of the boundary to condense steam in the diffusion zone on the gas side only and separately and continuously removing gases at opposite sides of the boundary in the diffusion zone.

9. The method defined in claim 8 in which the gas and steam streams entering the diffusion zone are measured and regulated in flow.

10. The method defined in claim 8 in which the pressures of the gas streams passing through the diffusion zone are accurately controlled.

11. A method of separating a constituent from gas comprising: passing said gas along one side of a porous diffusion boundary, diffusing the constituent through the boundary, passing a condensible sweep vapor along the opposite side of the boundary to sweep the diffused constituent from the face of the boundary, maintaining a temperature on the sweep vapor side of the boundary above the condensation temperature of the sweep vapor condensing on the gas side the sweep vapor that may diffuse through the boundary in opposition to the constituent diffusing through the boundary to increase the volume of constituent diffusing through the boundary and separating the diffused constituent from the sweep vapor.

12. In a method of the type described, the steps of passing a condensible sweep medium through a relatively long narrow passage between one face of a porous diffusion boundary and a wall which is maintained at a temperature above that at which condensation of said sweep medium occurs, passing a gas through a relatively long narrow passage between the other face of said porous diffusion boundary and a wall which is maintained at a temperature substantially below that at which condensation of said sweep medium occurs, and removing the sweep medium from the diffused gas.

FREDERICK ANTON SCHWERTZ.

REFERENCES CITED

The following references are of record in the file of this patent:

UNITED STATES PATENTS

| Number | Name | Date |
|---|---|---|
| 1,496,757 | Lewis et al | June 3, 1924 |
| 1,881,490 | Gmelin et al. | Oct. 11, 1932 |
| 2,255,069 | Maier | Sept. 9, 1941 |